(12) United States Patent
Miller et al.

(10) Patent No.: US 7,379,971 B2
(45) Date of Patent: May 27, 2008

(54) TIME-TO-DISCONNECT ENFORCEMENT WHEN COMMUNICATING WITH WIRELESS DEVICES THAT HAVE TRANSIENT NETWORK ADDRESSES

(75) Inventors: Quentin S. Miller, Sammamish, WA (US); Donald J. McNamara, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 868 days.

(21) Appl. No.: 10/300,271

(22) Filed: Nov. 19, 2002

(65) Prior Publication Data

US 2004/0098487 A1 May 20, 2004

(51) Int. Cl.
*G06F 15/16* (2006.01)
(52) U.S. Cl. .................. 709/206; 709/207; 709/245
(58) Field of Classification Search ............. 709/206, 709/207, 245
See application file for complete search history.

(56) References Cited

U.S. PATENT DOCUMENTS

| | | | |
|---|---|---|---|
| 6,993,583 B2 * | 1/2006 | Anderson et al. ........... 709/226 |
| 2002/0045437 A1 * | 4/2002 | Kesler ........................ 455/411 |
| 2002/0136226 A1 * | 9/2002 | Christoffel et al. .......... 370/401 |
| 2002/0159569 A1 * | 10/2002 | Hasegawa ................. 379/67.1 |
| 2003/0028671 A1 * | 2/2003 | Mehta et al. ................ 709/245 |

OTHER PUBLICATIONS

Eskil Ahlin, Telia "Ungraceful Session Termination in the IM Domain." Sophia Antipolis/France, Oct. 17-19, 2000. Bristol, UK, Sep. 4-8, 2000. XP-002273140.
"The User of IPv6 Addressing Privacy Within IMS" Ericsson, Victoria, Canada May 14-17, 2002. XP-002273362.
Allen, A, et al. "3GPP Work Related to SIP Based Messaging" Internet Draft, Jun. 26, 2002. XP-002273141.
Donovan. S. "Session Timers in the Session Initiation Protocol" Internet Engineering Task Force, Internet Draft, Nov. 4, 2002. EP-002273142.

* cited by examiner

*Primary Examiner*—John Follansbee
*Assistant Examiner*—Dhairya A Patel
(74) *Attorney, Agent, or Firm*—Workman Nydegger

(57) ABSTRACT

A wireless device constructs a message that includes a representation of a time-to-disconnect, and then transmits the message over a carrier network to a receiving computing system. The time-to-disconnect indicates a time beyond which the receiving computing system should not send a response to the message (or any other message) using the temporary network address that was assigned to the wireless device at the time the message was transmitted. The wireless device attempts to stay connected to thereby retain that address until the time-to-disconnect expires. When the response is ready to send back, if the time-to-disconnect has not yet expired, the response is sent to the wireless device using the same network address that the wireless device had at the time the original message was sent. Otherwise, if the time-to-disconnect is exceeded, then the receiving computing system does not attempt transmission of the response using that network address.

58 Claims, 3 Drawing Sheets

TIME-TO-DISCONNECT ENFORCEMENT WHEN COMMUNICATING WITH WIRELESS DEVICES THAT HAVE TRANSIENT NETWORK ADDRESSES

BACKGROUND OF THE INVENTION

1. The Field of the Invention

The present invention relates to mobile communications technology, and more specifically, to mechanisms for enforcing a time-to-disconnect when sending messages to a wireless device that has a transient network address.

2. Background and Related Art

Computing technology has revolutionized the way people work and play and has contributed enormously to the advancement of humankind. Computers now aid in innumerable applications such as word processing, computer simulations, advanced gaming, voice recognition, among many more. Computing systems now come in a wide-variety of forms including, for example, desktop computers, laptop computers, Personal Digital Assistants (PDAs), and even mobile telephones and devices.

Some mobile wireless devices such as Personal Digital Assistants and wireless telephones have sophisticated memory and general processing capability that allow the mobile device to perform many tasks previously only performed by larger desktop computers. These tasks may even include tasks that require communication over data networks thereby allowing users to access the Internet and perform e-mail tasks even while they are mobile.

Generally speaking, there are two major transport level protocols that are used with the IP protocol. One is called Transmission Control Protocol (TCP). IP protocol deals only with the delivery of packets, whereas TCP enables two computing systems to establish a connection and reliably exchange data. TCP guarantees that the data will be delivered in the same order in which it was sent. The other major transport level protocol is User Datagram Protocol (UDP), which does not establish a connection between a sending and receiving computing system. Also, UDP provides very little error control. Since UDP does not involve an established connection between the two communicating computing systems, UDP is often referred to as a "connectionless protocol". Other connectionless protocols include, for example, Ethernet and IPX.

Regardless of the particular protocol used, a mobile wireless device may often need to have its address changed. For example, when communicating over an IP-based wireless carrier network, a wireless device may disconnect from the wireless network thereby forcing a disassociation of the IP address that identified the wireless device while connected. Furthermore, even while connected to the carrier network, the wireless device may move from one Public Switched Data Network (PSDN) to another thereby forcing a reassignment of the IP address associated with the wireless device.

Accordingly, if the wireless device were to send a message over the wireless carrier network to the receiving computing system, there is some possibility that by the time a response to the message is returned, the assignment of the network address to the wireless device may have been revoked thereby resulting in non-delivery of the response. Worse yet, the old network address may have been assigned to another wireless device resulting in the wrong wireless device being delivered the response.

Accordingly, what would be desirable are mechanisms for more reliably communicating in a wireless environment in which network addresses are only transiently assigned to wireless devices.

BRIEF SUMMARY OF THE INVENTION

The foregoing problems with the prior state of the art are overcome by the principles of the present invention, which are directed towards mechanisms that enforce a time-to-disconnect for a wireless device when sending messages to the wireless device over a carrier network. The mechanism guards against possible misdirection of a response to the message (or even other uncorrelated messages) due to a disassociation of a previous address with the wireless device.

The wireless device constructs a message that will hereinafter be referred to as an "inbound message" since the message will be inbound with respect to the receiving computing system. The inbound message includes a data field that at least indirectly represents a time-to-disconnect. For example, the time-to-disconnect may be expressly stated or perhaps implied based on the content of the data field. The time-to-disconnect is a time after which any outbound messages should not be dispatched to the wireless device using the transient network address associated with the time-to-disconnect. The wireless device establishes a connection to the carrier network, if one had not already been established, and then dispatches the inbound message to the receiving computing system over the carrier network. The wireless device maintains the connection until the time-to-disconnect has expired. Then, if the time-to-disconnect had not been extended, the wireless device may disconnect. Upon disconnection, the temporary network address assigned to the wireless device is revoked.

Upon receiving the inbound message from the wireless device over the carrier network, the receiving computing system identifies the time-to-disconnect for the wireless device by, for example, reading and interpreting the data field included in the inbound message. When the receiving computing system is to send back an outbound message (such as a response to the inbound message), the receiving computing system determines whether or not the time-to-disconnect has been exceeded, and then dispatches the outbound message to the wireless device using the temporary designated address only if the time-to-disconnect has not been exceeded.

If the wireless device attempts to stay connected thereby having the same temporary network address until at least the designated time-to-disconnect, and if the receiving computing system only sends outbound messages using that temporary network address if it is still before the designated time-to-disconnect, it would be much more likely that the wireless device will receive the outbound messages as compared to not taking consideration of the time-to-disconnect.

If the time-to-disconnect has been exceeded, the receiving computing system may wait for the wireless device to reconnect and then send the outbound message(s). The receiving computing system may also attempt to send the outbound message(s) to the wireless device using an alternative transport mechanism that is different than the transport mechanism that the wireless device originally used to send the inbound message. For example, if the wireless device sent the inbound message using UDP over IP, the response may be returned using Short-text Messaging Service (SMS).

Additional features and advantages of the invention will be set forth in the description that follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

The principles of the present invention involve a wireless device that constructs a message that includes a representation of a time-to-disconnect, and transmits the message over a carrier network to a receiving computing system. That message will be referred to as the "inbound" message since the message is inbound from the perspective of the receiving computing system. The time-to-disconnect indicates a time beyond which the receiving computing system should not send any outbound messages (e.g., a response to the inbound message) using the temporary network address that was assigned to the wireless device at the time the inbound message was transmitted. The wireless device attempts to stay connected to thereby retain that address until the time-to-disconnect expires. When outbound message is ready to send back, if the time-to-disconnect has not yet expired, the outbound message is sent to the wireless device using the same network address that the wireless device had at the time the inbound message was sent. Otherwise, if the time-to-disconnect is exceeded, then the receiving computing system does not attempt transmission of the outbound message using that network address. Instead, the receiving computing system may await the next connection from the wireless device, or may attempt to send the outbound message using an alternative transport mechanism.

Embodiments within the scope of the present invention include computer-readable media for carrying or having computer-executable instructions or data structures stored thereon. Such computer-readable media can be any available media which can be accessed by a general purpose or special purpose computer. By way of example, and not limitation, such computer-readable media can comprise physical computer-readable media such as RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

When information is transferred or provided over a network or another communications connection (either hardwired, wireless, or a combination of hardwired or wireless) to a computer, the computer properly views the connection as a computer-readable medium. Thus, any such a connection is properly termed a computer-readable medium. Combinations of the above should also be included within the scope of computer-readable media. Computer-executable instructions comprise, for example, any instructions and data which cause a general purpose computer, special purpose computer, or special purpose processing device to perform a certain function or group of functions. The computer-executable instruction may be, for example, binaries, intermediate format instructions such as assembly language, or even source code.

Figure 1:
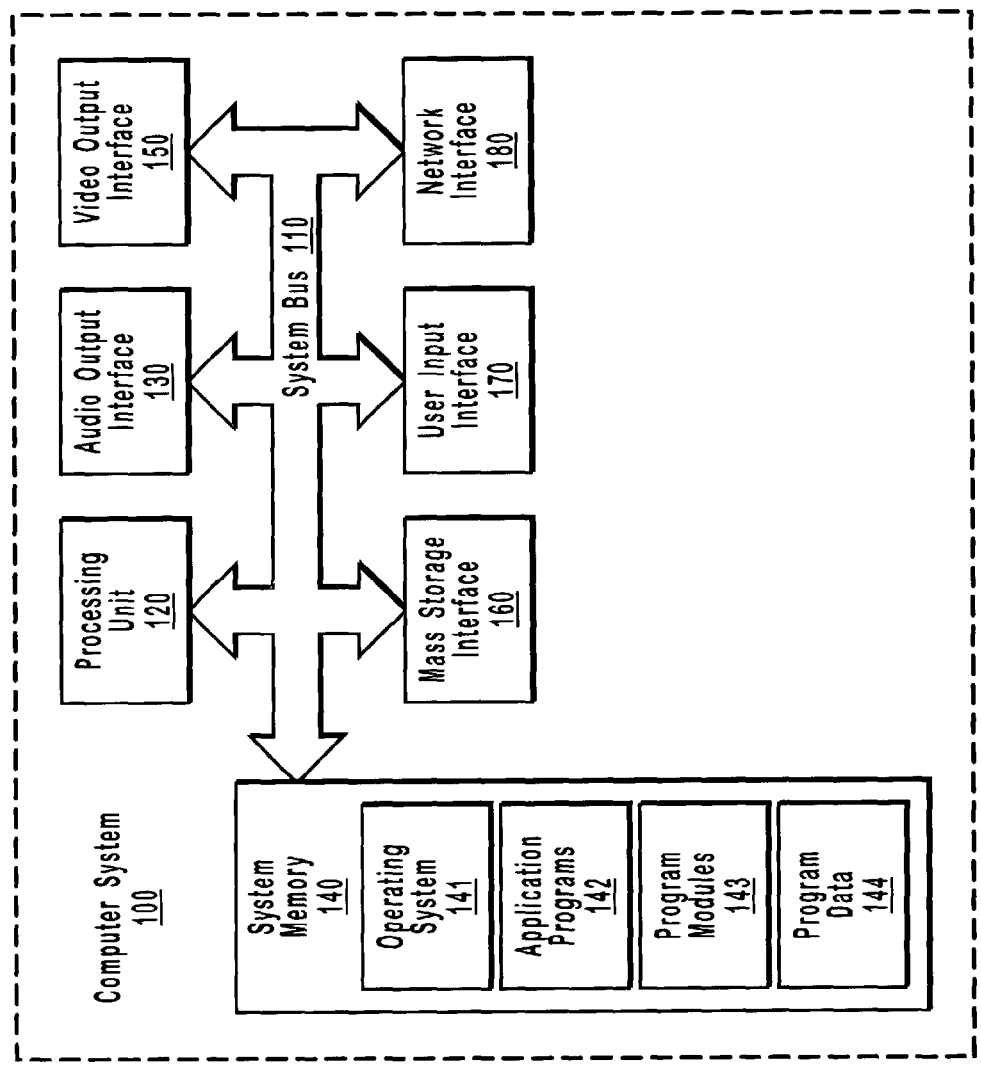
FIG. 1 illustrates a suitable operating environment for the principles of the present invention.

FIG. 1 and the following discussion are intended to provide a brief, general description of a suitable computing environment in which the invention may be implemented. Although not required, the invention will be described in the general context of computer-executable instructions, such as program modules, being executed by computer systems. Generally, program modules include routines, programs, objects, components, data structures, and the like, which perform particular tasks or implement particular abstract data types. Computer-executable instructions, associated data structures, and program modules represent examples of the program code means for executing acts of the methods disclosed herein.

With reference to FIG. 1, a suitable operating environment for the principles of the invention includes a general-purpose computer system in the form of a computer system 100. Computer system 100 may be, for example, a personal computer that has been adapted to perform the operations disclosed herein.

Computer system 100 includes a user input interface 170 that receives information from an input device, such as, for example, a keyboard, microphone, mouse, or, in the case of a mobile device, a touch pad. An input device can be coupled to user input interface 170 so as to enable the entry of information. An input device may transfer information over such a coupling in response to preprogrammed data or user manipulation of the input device.

Computer system 100 includes a video output interface 150 that provides a video output signal to external video display devices. Computer system 100 may be integrally positioned with or separate from a video display device, such as, for example, a color or monochrome computer monitor. A video display device can be coupled to video output interface 150 so as to receive a provided video output signal. In the case of a mobile device, the video output interface may interface with a relatively smaller display.

Similarly, computer system 100 includes an audio output interface 130 that provides an audio output signal to external audio output devices. Computer system 100 may also be integrally positioned with or separate from an audio system, which may include a speaker or other device capable of emitting sound data. An audio system can be coupled to audio output interface 130 so as to receive a provided audio output signal.

Computer system 100 includes processing unit 120, which allows for complex and flexible general-purpose processing capabilities. Processing unit 120 executes computer-executable instructions designed to implement features of computer system 100, including features of the present invention. Processing unit 120 is coupled to system bus 110, which also interconnects various other system components including system memory 140.

System memory 140 generally represents a wide variety of volatile and/or non-volatile memories and may include types of memory previously discussed. However, the particular type of memory used in computer system 100 is not important to the present invention. Program code means comprising one or more program modules may be stored in system memory 140. The one or more program modules may include an operating system 141, one or more application programs 142, other program modules 143, and program data 144.

Computer system 100 may also include mass storage interface 160, although mobile telephones or PDAs typically do not have mass storage devices. The mass storage interface 160 can read data from and/or write data to a mass storage device, such as, for example, a magnetic disk or optical disk. A mass storage device can be coupled to mass storage interface 160 so as to enable the reading and writing of data. When a mass storage device is coupled to mass storage interface 160, one or more program modules including operating system 141, application programs 142, other program modules 143, and program data 144 may be stored in the mass storage device.

Computer system 100 is connectable to networks, such as, for example, an office-wide or enterprise-wide computer network, an intranet and/or the Internet. Computer system 100 includes network interface 180, through which computer system 100 receives data from external sources and/or transmits data to external sources. Computer system 100 may exchange data with external sources, such as, for example, remote processor systems and/or databases over such a network.

While FIG. 1 illustrates an example of a computing system that may implement the principles of the present invention, any computing system may, with suitable configuration, implement the features of the present invention. In the description and in the claims, a "computing system" is defined broadly as any hardware component or components that are capable of using software to perform one or more functions. Examples of computing systems include desktop computers, laptop computers, Personal Digital Assistants (PDAs), telephones, or any other system or device that has processing capability.

Figure 2:
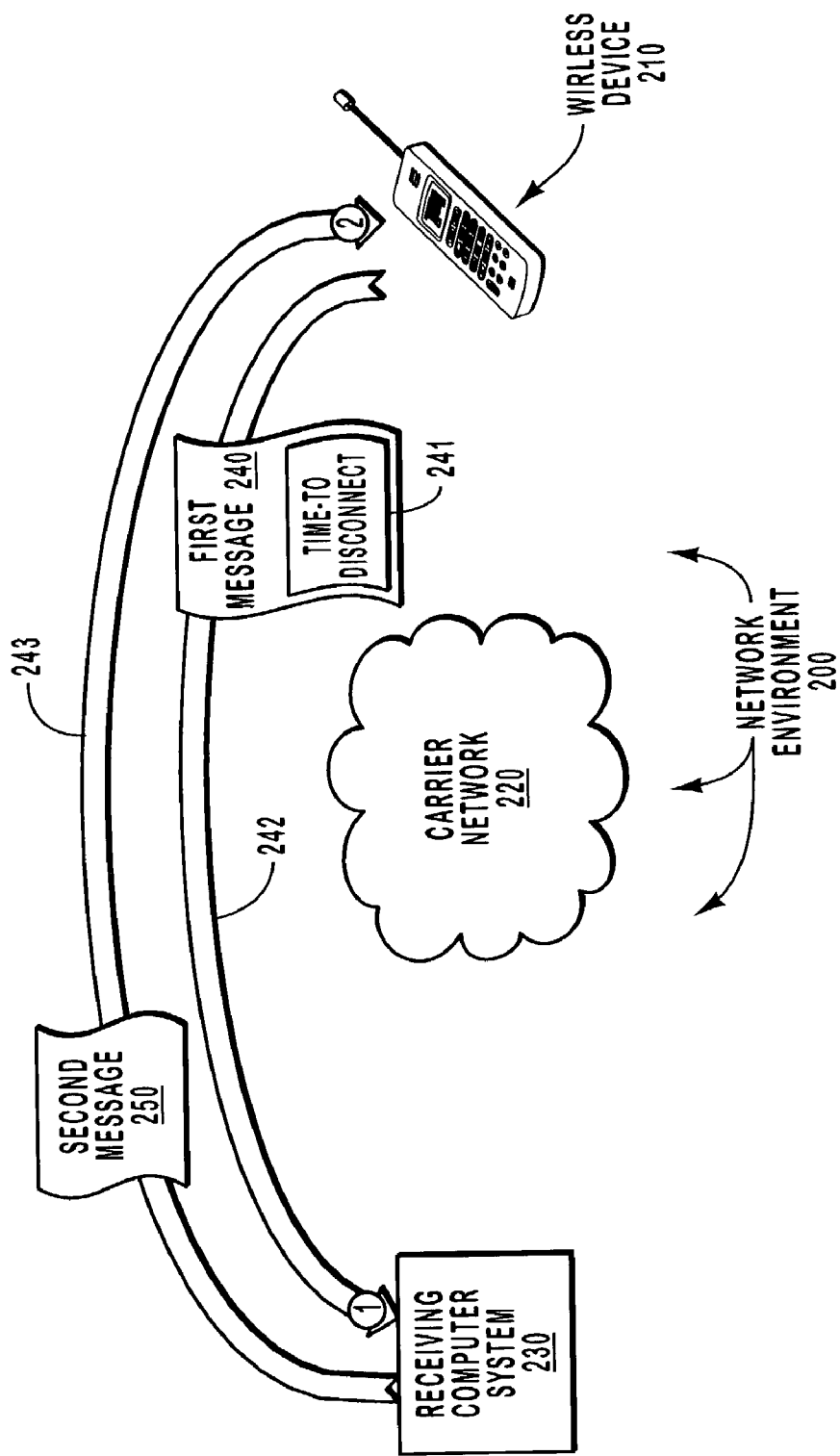
FIG. 2 illustrates a suitable network environment in which the principles of the present invention may operation.

FIG. 2 illustrates a network environment 200 that includes a wireless device 210 and a receiving computing system 230 communicating over a carrier network 220. The wireless device 210 may be any device capable of communicating over a wireless network (whether or not that same wireless device 210 may also be capable of communicating over a wired network). The wireless device 210 may be, for example, a laptop computer, a Personal Digital Assistant (PDA) or a telephone, and may be generally structured as described above with respect to the computer system 100.

The receiving computing system 230 may be a proxy computing system that serves a number of wireless devices that are connected, or that may be connected, to a carrier network 220. The receiving computing system 230 may also be structured as described above for computer 120. In a typical case, however, the wireless device 210 may be smaller than receiving computing system 230 since wireless devices are often mobile, although this need not be the case. The receiving computing system 230 may alternatively be another wireless device or another computing system that is not necessarily associated with or managed by any particular carrier.

Figure 3:
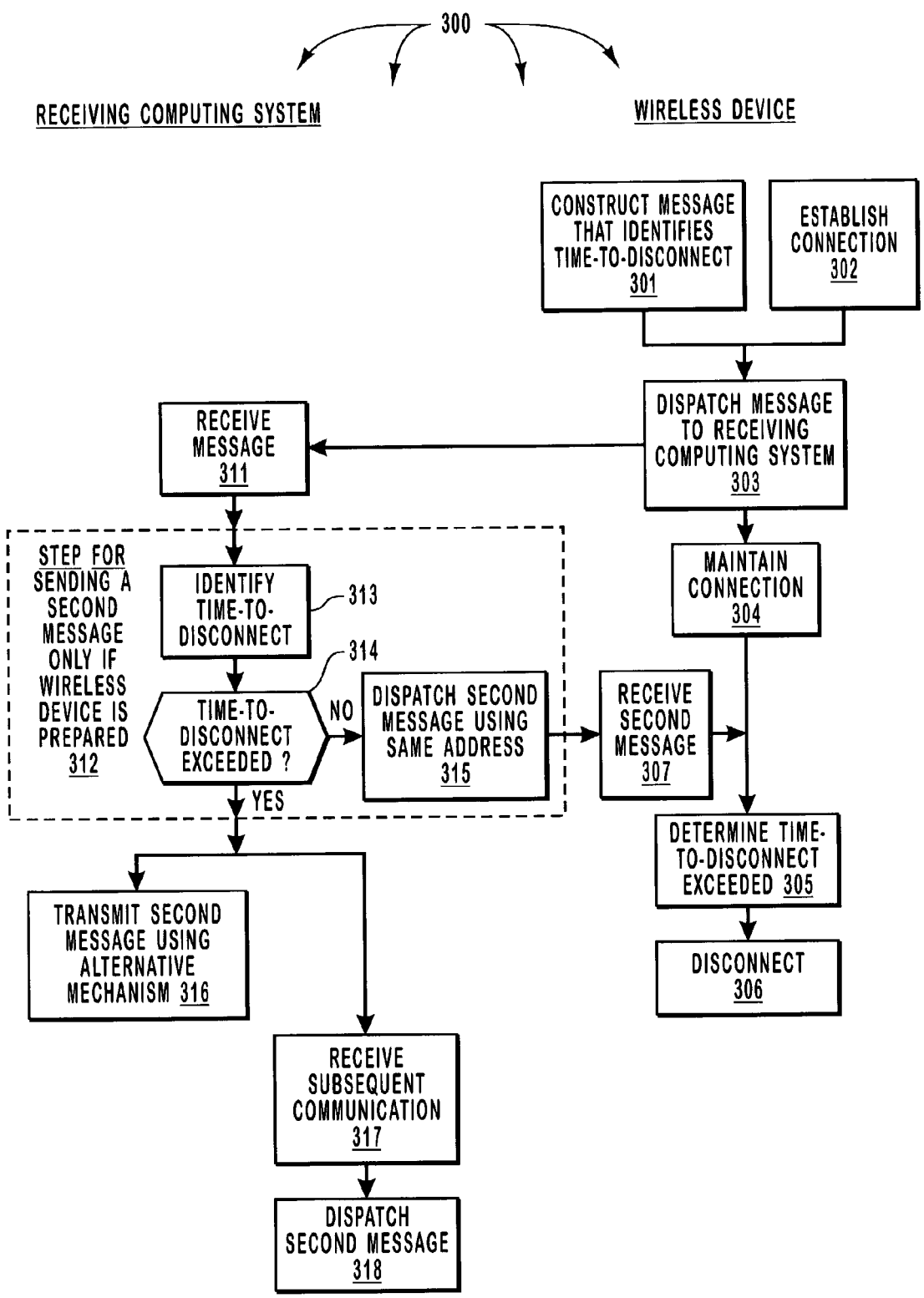
FIG. 3 illustrates a flowchart of a method for enforcing a time-to-disconnect for a wireless device in accordance with the present invention.

Referring to FIG. 3, a method 300 is shown for enforcing a time-to-disconnect for a wireless device so as to guard against possible misdirection of a response to the request due to a disassociation of a previous address with the wireless device. The method 300 may be performed in the network environment 200 of FIG. 2. Accordingly, the method 300 of FIG. 3 will be described with frequent reference to the network environment 200 of FIG. 2.

A step and several acts of the method 300 are performed by the receiving computing system 230 as represented in the left column of FIG. 3 under the heading "RECEIVING COMPUTING SYSTEM". Other acts of the method 300 are performed by the wireless device 210 as represented in the right column of FIG. 3 under the heading "WIRELESS DEVICE".

The wireless device 210 constructs a message that includes a data field that at least indirectly represents a time-to-disconnect (act 301). For example, referring to FIG. 2, the wireless device 210 sends an inbound message 240 to the receiving computing system 230. The message includes a data field 241 that at least indirectly represents a time-to-disconnect. The time-to-disconnect is a time after which a response to the message (or any other outbound message for that matter) should not be dispatched to the wireless device using the transient network address associated with the time-to-disconnect. The data field 241 may expressly list the time-to-disconnect, or a time or other data that the receiving computing system may use to derive the time-to-disconnect. Alternatively, the data field may not exist at all (or may be empty) in which case the time-to-disconnect may be a default time-to-disconnect to be determined by the receiving computing system. The time-to-disconnect may be extended by, for example, receiving a subsequent message that indicates an extended time-to-disconnect.

The wireless device establishes a connection to the carrier network (act 302). The wireless device may establish this connection either before, after, or concurrently with the act of constructing the inbound message (act 301). Accordingly, to represent this lack of time dependence between the establishment of the connection and the construction of the inbound message, acts 301 and 302 are illustrated as being in parallel.

Once the in-bound message is constructed, and after a connection to the carrier network is established (if one had not been established already), the wireless device dispatches the inbound message to the receiving computing system over the carrier network. This dispatching is represented in FIG. 2 by arrow 242 having a number "1". The message may be dispatched by any possible mechanism including, for example, a connectionless or connection-oriented protocol. Typical connectionless protocols might include, for example, User Datagram Protocol (UDP), or Wireless Application Protocol (WAP). A connection-oriented protocol might include, for example, Transmission Control Protocol (TCP). Although both connectionless protocols and connection-oriented protocols would require a connection to the carrier network 220, connectionless protocols do not require a separate connection between the wireless device and the receiving computing system in order to complete the transmission.

Once the message is dispatched, the wireless device maintains the connection from at least the time the message was dispatched to the receiving computing system until at least the time-to-disconnect (act 304). During this connection time, the wireless device will have an assigned network address of a temporary nature. The address will last until the wireless device is disconnected from the carrier network, or upon the occurrence of some other event, such as the changing of a Public Switched Data Network (PSDN). After determining that the time-to-disconnect has been exceeded (act 305), the wireless device may disestablish the connection to the carrier network (act 306).

From the receiving computing system's perspective, the receiving computing system receives the in-bound message from the wireless device over the carrier network (act 311). The receiving computing system then performs a functional, result-oriented step for sending an outbound message only if the wireless devices is still prepared to receive the outbound message (step 312). This functional, result-oriented step includes any corresponding acts for accomplishing this purpose. However, in the illustrated embodiment of FIG. 3, step 312 includes corresponding acts 313, 314 and 315.

More specifically, when an outbound message is to be sent, the receiving computing system identifies a time-to-disconnect for the wireless device (act 313). For example, if the data field 241 includes an expression of the time-to-disconnect, then the time-to-disconnect may be identified by reading the data field 241. On the other hand, if the data field 241 includes a time or other piece of data from which the time-to-disconnect may be derived using a set of derivation rules, the receiving computing system may identify the time-to-disconnect by reading the data field, and following the derivation rules. If the data field 241 is empty or not present, then the receiving computing system may determine that a predetermined default time-to-disconnect is to be applied. The time-to-disconnect may also be extended by having received a subsequent message that has another data field from which the extended time-to-disconnect may be directly read or derived.

Before sending the outbound message, the receiving computing system determines whether or not the time-to-disconnect is exceeded (act 314). If the time-to-disconnect has not been exceeded (NO in act 314), then the receiving computing system dispatches the outbound message to the wireless device using the temporary designated address (act 315), thereby completing the functional, result-oriented step 312. The wireless device would then receive the outbound message (e.g., the response to the inbound message) presumably sometime while the connection to the carrier network was still being maintained (act 307). For example, referring to FIG. 2, the receiving computing system 230 returns a second message 250 to the wireless device 210 as represented by arrow 243 having a head labeled with the number "2".

If the time-to-disconnect has been exceeded (YES in act 314), then the receiving computing system will not send the outbound message to the wireless device using the temporary designated address that the wireless device possessed at the time the inbound message was sent. Instead, the receiving computing system may do one of several things.

One alternative is to simply abandon the outbound massage and remove any state information related to the inbound message if the outbound message was a response to the outbound message.

Another alternative if the outbound message is a response to the inbound message is to keep state information relevant to the inbound message, and then send the outbound message when the receiving computing system once again receives a communication from the same wireless device (act 317). This time, however, the communication may indicate that the wireless device has another designated address. That designated address would be used to send the response (act 318).

As yet another alternative, the outbound message could be dispatched even after the time-to-disconnect expires using an alternative transport other than the transport used to communicate the inbound message from the wireless device to the receiving computing system (act 316). For example, if the original inbound message was dispatched using UDP, the response may be returned using Short-text Messaging Service (SMS).

Which of these alternatives are implemented may depend on a priority associated with the message. For example, low priority messages may result in a response to the message being completely abandoned if the time-to-disconnect is exceeded. Alternative communication mechanisms might be used to return a response in a timely manner even if the time-to-disconnect had been exceeded if the message is higher priority.

The message 240 may be any type of message that may be communicated over a wireless carrier network. Furthermore, the data field 241 may be located anywhere within the message and interpretable by any layer of a protocol stack. For example, the data field may be a field pre-pended or appended to an associated Protocol Data Unit (PDU) as thereby interpretable by the IP layer in a protocol stack. Alternatively, the data field 241 may be located within a header or body field of a Simple Object Access Protocol (SOAP) envelope to thereby be interpreted by an application layer in the protocol stack.

Accordingly, the principles of the present invention allow for improved efficiency when communicating with or using a wireless device over a carrier network. In particular, when an inbound message is sent from a wireless device over the carrier network, the chance that a subsequent outbound message will be sent even though the wireless device has disconnected from the carrier network is reduced. In addition, the chance that a misdirected outbound message may be received by a wireless device that did not send the inbound message is also reduced.

There is always a chance that the wireless device may be reassigned an address or may otherwise be disconnected even before the time-to-disconnect expires. For example, the wireless device may simply pass through a tunnel as its user is traveling thereby losing the connection to the carrier network. Alternatively or in addition, the wireless device may change PSDNs thereby forcing a reassigned address.

In these cases, the method 300 may still sometimes result in one or more outbound messages not being received by the wireless device. However, assuming that there are no forced reassignments of addresses and the wireless device is successful in maintaining a connection to the carrier network during the period until the time-to-disconnect expires, there is a significantly reduced chance that a response will be sent in vane or otherwise be misdirected.

The principles of the present invention also allow for the wireless device to have control over how long the wireless device may be connected to the carrier network. For example, when sending a request for e-mail updates, the wireless device may want to stay connected for just a relatively short period of time of thirty seconds. On the other hand, if the wireless device is to engage in instant messaging, the wireless device may want a more sustained communication in which the time-to-disconnect lasts for the next five minutes or so. Accordingly, the wireless device may factor in the nature of the locally running network application as well as other circumstances in determining how long it is willing to stay connected to the carrier network.

Even the cost of the connection to the carrier network in terms of time may be taken into consideration. For example, if the wireless device is connected during peak hours, the time-to-disconnect may tend towards shorter time-to-disconnects. On the other hand, if the wireless device knows that the user has significant time remaining in a fixed amount of minutes that have already been paid for under a flat fee for the current billing period, and if the current billing period is about to come to a close, then the wireless device may tend towards a longer time-to-disconnects for the convenience of its user.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes, which come within the meaning and range of equivalency of the claims, are to be embraced within their scope.

What is claimed and desired secured by United States Letters Patent is:

1. In a receiving computing system that is configured to receive a message from a wireless device over a carrier network, a method for enforcing a time-to-disconnect for the wireless device so as to guard against possible misdirection of future messages to the wireless device due to a disassociation of a previous address with the wireless device, the method comprising the following:
   an act of receiving, by a receiving computing system, a first message from the wireless device over the carrier network, the wireless device having a temporary designated address, the message having been constructed by the wireless device, and the message including a data field comprising information indicating a time-to-disconnect for the wireless device;
   reading, by the receiving computing system, the data field comprising information indicating a time-to-disconnect;
   an act of identifying, by the receiving computing system, from information included within the data field, a time-to-disconnect for the wireless device, the time-to-disconnect being a time after which a message should not be dispatched by the receiving computing system to the wireless device using the temporary designated address;
   an act of determining whether or not the time-to-disconnect has been exceeded; and
   an act of dispatching a second message to the wireless device using the temporary designated address only if the time-to-disconnect has not been exceeded.

2. A method in accordance with claim 1, wherein the act of dispatching a second message to the wireless device comprises the following:
   an act of dispatching a response to the first message to the wireless device, wherein the second message is the response to the first message.

3. A method in accordance with claim 1, wherein the act of dispatching a second message to the wireless device comprises the following:
   an act of dispatching a message that is uncorrelated with the first message.

4. A method in accordance with claim 3, wherein the act of identifying a time-to-disconnect for the wireless device comprises the following:
   an act of reading data from a third message, the third message being a message received from the wireless device after the first message was received from the wireless device; and
   an act of deriving the time-to-disconnect from the read data field.

5. A method in accordance with claim 4, wherein the time-to-disconnect derived from the third message is later than any other time-to-disconnects previously associated with the wireless device.

6. A method in accordance with claim 1, wherein the act of receiving a first message from the wireless device over the carrier network comprises the following:
   an act of receiving a message from the wireless device using a connectionless protocol.

7. A method in accordance with claim 6, wherein the act of receiving a first message from the wireless device using a connectionless protocol comprises the following:
   an act of receiving a message from the wireless device using User Datagram Protocol (UDP).

8. A method in accordance with claim 6, wherein the act of receiving a first message from the wireless device using a connectionless protocol comprises the following:
   an act of receiving a message from the wireless device using Wireless Application Protocol (WAP).

9. A method in accordance with claim 1, wherein the act of receiving a first message from the wireless device over the carrier network comprises the following:
   an act of receiving a message from the wireless device using Transmission Control Protocol (TCP).

10. A method in accordance with claim 1, wherein the act of identifying a time-to-disconnect for the message comprises the following:
    an act of reading a time from the first message; and
    an act of deriving the time-to-disconnect from the read time.

11. A method in accordance with claim 1, wherein the act of identifying a time-to-disconnect for the message comprises the following:
    an act of reading the time-to-disconnect directly from the first message.

12. A method in accordance with claim 1, wherein the act of identifying a time-to-disconnect for the message comprises the following:
    an act of reading a data field from the first message; and
    an act of deriving the time-to-disconnect from the read data field.

13. A method in accordance with claim 1, wherein the act of identifying a time-to-disconnect for the message comprises the following:
    an act of determining that a default time-to-disconnect applies to the second message; and
    an act of applying the default time-to-disconnect as the time-to-disconnect.

14. A method in accordance with claim 1, wherein the act of dispatching a second message to the wireless device using the temporary designated address only if the time-to-disconnect has not been exceeded comprises the following:
    an act of determining that the time-to-disconnect has not been exceeded; and
    an act of dispatching the second message using the temporary designated address after it has been determined that the time-to-disconnect has not been exceeded.

15. A method in accordance with claim 1, wherein the act of determining comprises an act of determining that the time-to-disconnect has been exceeded, the method further comprising the following:
an act of receiving a communication from the wireless device indicating that the wireless device has another designated address; and
an act of dispatching the second message using the other designated address.

16. A method in accordance with claim 1, wherein the act of determining comprises
an act of determining that the time-to-disconnect has been exceeded, the method further comprising the following:
an act of dispatching the second message using an alternative transport other than the transport used to communicate the first message from the wireless device to the receiving computing system.

17. A computer program product of use in a receiving computing system that is configured to receive a message from a wireless device over a carrier network, the computer program product for implementing a method for enforcing a time-to-disconnect for the wireless device so as to guard against possible misdirection of future messages to the wireless device due to a disassociation of a previous address with the wireless device, the computer program product comprising one or more computer-readable storage media having encoded thereon stored on computer-executable instructions which, when executed, perform the method of claim 1.

18. A computer program product in accordance with claim 17, wherein the computer-executable instructions for causing a second message to be dispatched to the wireless device comprise the following:
computer-executable instructions for causing a response to the first message to be dispatched to the wireless device, wherein the second message is the response to the first message.

19. A computer program product in accordance with claim 17, wherein the computer-executable instructions for causing a second message to be dispatched to the wireless device comprises the following:
computer-executable instructions for causing a message to be dispatched that is uncorrelated with the first message.

20. A computer program product in accordance with claim 19, wherein the computer-executable instructions for identifying a time-to-disconnect for the wireless device comprises the following:
computer-executable instructions for reading data from a third message, the third message being a message received from the wireless device after the first message was received from the wireless device; and
computer-executable instructions for deriving the time-to-disconnect from the read data field.

21. A computer program product in accordance with claim 20, wherein the time-to-disconnect derived from the third message is later than any other time-to-disconnects previously associated with the wireless device.

22. A computer program product in accordance with claim 17, wherein the computer-executable instructions for detecting receipt of a first message from the wireless device over the carrier network comprise the following:
computer-executable instructions for detecting receipt of a message from the wireless device using a connectionless protocol.

23. A computer program product in accordance with claim 22, wherein the computer-executable instructions for detecting receipt of a first message horn the wireless device using a connectionless protocol comprise the following:
computer-executable instructions for detecting receipt of a message from the wireless device using User Datagram Protocol (UDP).

24. A computer program product in accordance with claim 22, wherein the computer-executable instructions for detecting receipt of a first message from the wireless device using a connectionless protocol comprise the following:
computer-executable instructions for detecting receipt of a message from the wireless device using Wireless Application Protocol (WAP).

25. A computer program product in accordance with claim 17, wherein the computer-executable instructions for detecting receipt of a first message from the wireless device over the carrier network comprise the following:
computer-executable instructions for detecting receipt of a message horn the wireless device using Transmission Control Protocol (TCP).

26. A computer program product in accordance with claim 17, wherein the computer-executable instructions for identifying a time-to-disconnect for the message comprise the following:
computer-executable instructions for causing a time to be read from the first message; and
computer-executable instructions for deriving the time-to-disconnect from the read time.

27. A computer program product in accordance with claim 17, wherein the computer-executable instructions for identifying a time-to-disconnect for the wireless device comprise the following:
computer-executable instructions for causing the time-to-disconnect to be read directly from the first message.

28. A computer program product in accordance with claim 17, wherein the computer-executable instructions for identifying a time-to-disconnect for the wireless device comprise the following:
computer-executable instructions for causing a data field to be read from the first message; and
computer-executable instructions for deriving the time-to-disconnect from the read data field.

29. A computer program product in accordance with claim 17, wherein the computer-executable instructions for identifying a time-to-disconnect for the wireless device comprise the following:
computer-executable instructions for determining that a default time-to-disconnect applies to the wireless device; and
computer-executable instructions for applying the default time-to-disconnect as the time-to-disconnect.

30. A computer program product in accordance with claim 17, wherein the computer-executable instructions for causing a second message to be dispatched to the wireless device only if the time-to-disconnect has not been exceeded comprise the following:
computer-executable instructions for determining that the time-to-disconnect has not been exceeded; and
computer-executable instructions for causing the second message to be dispatched after the computer-executable instructions for determining that the time-to-disconnect has not been exceeded have been executed.

31. A computer program product in accordance with claim 30, wherein the computer-executable instructions for determining comprise computer-executable instructions for determining that the time-to-disconnect has been exceeded, the one or more computer-readable media further having thereon the following:

computer-executable instructions for detecting receipt of a communication from the wireless device indicating that the wireless device has another designated address; and computer-executable instructions for causing the second message to be dispatched to the wireless device using the other designated address.

32. A computer program product in accordance with claim 30, wherein the computer-executable instructions for determining comprise computer-executable instructions for determining that the time-to-disconnect has been exceeded, the one or more computer-readable media further having thereon the following:

computer-executable instructions for causing the second message to be dispatched using an alternative transport other than the transport used to communicate the first message from the wireless device to the receiving computing system.

33. A computer program product in accordance with claim 17, wherein the one or more computer-readable media are physical media.

34. A computer program product in accordance with claim 33, wherein the physical media is system memory.

35. A computer program product in accordance with claim 33, wherein the physical media is a persistent memory.

36. In a wireless device that is configured to send a message to a receiving computing system over a carrier network, a method for enforcing a time-to-disconnect for the wireless device so as to guard against possible misdirection of future messages to the wireless device due to a disassociation of a previous address with the wireless device, the method comprising the following:

an act of the wireless device constructing a message that includes a data field that indicates a time-to-disconnect, the time-to-disconnect being a time after which a response to the message should not be dispatched to the wireless device using the temporary designated address, and the time-to-disconnect being determined by the wireless device;

an act of establishing a connection to the carrier network;

an act of dispatching the message to the receiving computing system over the carrier network;

an act of maintaining the connection from at least the time the message was dispatched to the receiving computing system at least until the time-to-disconnect;

an act of determining that the time-to-disconnect has been exceeded; and an act of disestablishing the connection after it having been determined that the time-to-disconnect has been exceeded regardless of whether a response was received during the act of maintaining the connection.

37. A method in accordance with claim 36, wherein the act of disestablishing the connection is performed also after it has been determined that the time-to-disconnect has not been extended.

38. A method in accordance with claim 36, wherein the act of dispatching the message to the receiving computing system over the carrier network comprises the following:

an act of dispatching the message to the receiving computing system using a connectionless protocol.

39. A method in accordance with claim 38, wherein the act of dispatching the message to the receiving computing system using a connectionless protocol comprises the following:

an act of dispatching the message to the receiving computing system using User Datagram Protocol (UDP).

40. A method in accordance with claim 38, wherein the act of dispatching the message to the receiving computing system using a connectionless protocol comprises the following:

an act of dispatching the message to the receiving computing system using Wireless Application Protocol (WAP).

41. A method in accordance with claim 36, wherein the act of dispatching the message to the receiving computing system over the carrier network comprises the following:

an act of dispatching the message to the receiving computing system using Transmission Control Protocol (TCP).

42. A method in accordance with claim 36, wherein the act of constructing a message that includes a data field that at least indirectly represents a time-to-disconnect comprises the following:

an act of constructing a message that includes the time-to-disconnect.

43. A method in accordance with claim 36, wherein the act of constructing a message that includes a data field that at least indirectly represents a time-to-disconnect comprises the following:

an act of constructing a message that includes a time from which the time-to-disconnect may be derived.

44. A method in accordance with claim 36, wherein the act of constructing a message that includes a data field that at least indirectly represents a time-to-disconnect comprises the following:

an act of constructing a message that includes a data field from which the time-to-disconnect may be derived.

45. A method in accordance with claim 36, further comprising the following:

an act of receiving a response to the message during the time that the connection is maintained.

46. A computer program product of use in wireless device that is configured to send a message to a receiving computing system over a carrier network, the computer program product for implementing a method for enforcing a time-to-disconnect for the wireless device so as to guard against possible misdirection of future messages to the wireless device due to a disassociation of a previous address with the wireless device, the computer program product comprising one or more computer-readable storage media having encoded thereon stored on computer-executable instructions which, when executed, perform the method of claim 38.

47. A computer program product in accordance with claim 46, wherein the computer-executable instructions for disestablishing the connection is performed also after it has been determined that the time-to-disconnect has not been extended.

48. A computer program product in accordance with claim 46, wherein the computer-executable instructions for causing the message to be dispatched to the receiving computing system over the carrier network comprise the following:

computer-executable instructions for causing the message to be dispatched to the receiving computing system using a connectionless protocol.

49. A computer program product in accordance with claim 46, wherein computer-executable instructions for causing the message to be dispatched to the receiving computing system using a connectionless protocol comprise the following:

computer-executable instructions for causing the message to be dispatched to the receiving computing system using User Datagram Protocol (UDP).

50. A computer program product in accordance with claim 46, wherein computer-executable instructions for causing the message to be dispatched to the receiving computing system using a connectionless protocol comprise the following:
computer-executable instructions for causing the message to be dispatched to the receiving computing system using Wireless Application Protocol (WAP).

51. A computer program product in accordance with claim 46, wherein the computer-executable instructions for causing the message to be dispatched to the receiving computing system over the carrier network comprise the following:
computer-executable instructions for causing the message to be dispatched to the receiving computing system using Transmission Control Protocol (TCP).

52. A computer program product in accordance with claim 46, wherein the computer-executable instructions for constructing a message that includes a data field that at least indirectly represents a time-to-disconnect comprise the following:
computer-executable instructions for constructing a message that includes the time-to-disconnect.

53. A computer program product in accordance with claim 46, wherein the computer-executable instructions for constructing a message that includes a data field that at least indirectly represents a time-to-disconnect comprise the following:
computer-executable instructions for constructing a message that includes a time from which the time-to-disconnect may be derived.

54. A computer program product in accordance with claim 46, wherein the computer-executable instructions for constructing a message that includes a data field that at least indirectly represents a time-to-disconnect comprise the following:
computer-executable instructions for constructing a message that includes a data field from which the time-to-disconnect may be derived.

55. A computer program product in accordance with claim 46, wherein the one or more computer-readable media further have thereon the following:
computer-executable instructions for detecting receipt of a response to the message during the time that the connection is maintained.

56. A computer program product in accordance with claim 46, wherein the one or more computer-readable media are physical media.

57. A computer program product in accordance with claim 56, wherein the physical media is system memory.

58. A computer program product in accordance with claim 56, wherein the physical media is a persistent memory.

* * * * *